July 3, 1962 W. A. GEYGER 3,042,306
MAGNETIC-AMPLIFIER MULTIPLYING CIRCUITS
Filed Feb. 20, 1959 2 Sheets-Sheet 1

INVENTOR.
W. A. GEYGER
BY
ATTORNEYS.

United States Patent Office 3,042,306
Patented July 3, 1962

3,042,306
MAGNETIC-AMPLIFIER MULTIPLYING CIRCUITS
William A. Geyger, Takoma Park, Md., assignor to the United States of America as represented by the Secretary of the Navy
Filed Feb. 20, 1959, Ser. No. 794,782
2 Claims. (Cl. 235—178)
(Granted under Title 35, U.S. Code (1952), sec. 266)

The invention described herein may be manufactured and used by or for the Government of the United States of America for governmental purposes without the payment of any royalties thereon or therefor.

This invention relates generally to multiplying circuits employing magnetic amplifiers in conjunction with other magnetic-core components.

The invention provides apparatus with a high speed of response which will perform four quadrant multiplication of direct currents or voltages.

Previous to this invention, apparatus for performing multiplication involved the principle of the thermal wattmeter in which two thermocouples or thermoconverters are employed. Thermal wattmeters perform multiplication in accordance with the following equation:

$$(E_1+E_2)^2-(E_1-E_2)^2=4E_1E_2$$

where $E_1$ and $E_2$ are the signal voltages to be multiplied. The accuracy of this method is good, however thermocouples or converters have large thermal inertias and as a result the response time is very slow. For indirectly heated thermocouples the response time is about 3 to 5 seconds and with directly heated thermocouples, the response time is about one second. Another disadvantage of using thermocouples is that they are susceptable to damage upon slight overloading.

Another type of prior art device is the magnetic amplifier multiplying circuit of FIG. 1 which is described hereinafter. This type of multiplier however does not permit four quadrant multiplication because the two currents or voltages to be multiplied must always have the same respective polarities. In other words, if one or both the polarities of the input signals are reversed the circuit is rendered inoperative.

The circuit of the present invention is unique in providing for four quadrant multiplication with a high-speed of response while having the qualities of extreme reliability, ruggedness, and durability of magnetic circuits.

It is an object of this invention to provide a magnetic amplifier square-law circuit for the multiplication of direct currents or voltages.

It is another object of this invention to provide a magnetic amplifier square-law circuit for four quadrant multiplication of direct currents or voltages.

It is another object of this invention to provide magnetic amplifier apparatus for the multiplication of a pair of reversible polarity direct current signals.

It is another object of this invention to provide apparatus combining square law magnetic amplifier circuits with magnetic amplifiers for the multiplication of a pair of polarity reversible direct currents or voltages.

It is a further object of this invention to provide magnetic apparatus for the four-quadrant multiplication of two direct currents or voltages.

It is a still further object of this invention to provide high-speed of response apparatus for four quadrant multiplication of direct current signals.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 1:
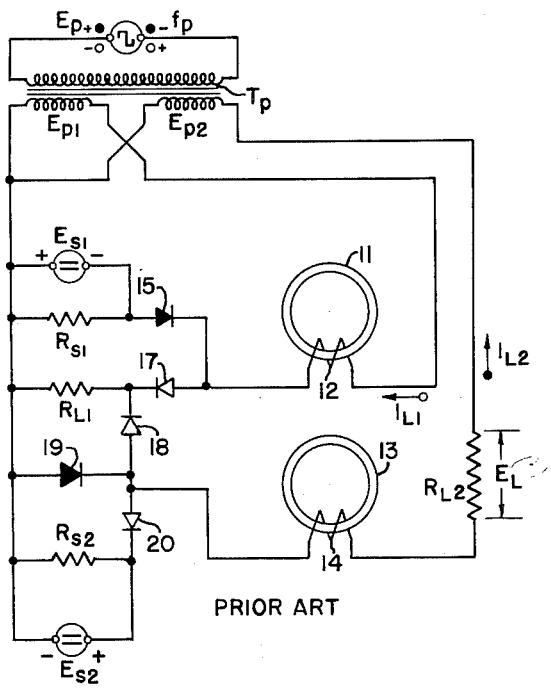
FIG. 1 illustrates a prior art magnetic amplifier multiplier circuit.

Referring now to FIG. 1 of the drawings, a source of square wave voltage $E_p$ having a frequency $f_p$ supplies transformer $T_p$. Transformer $T_p$ has two secondary windings which provide voltages $E_{p1}$ and $E_{p2}$. An input or converter stage includes saturable core 11, winding 12, resistance $R_{L1}$ and a first signal voltage $E_{S1}$. An output or multiplier stage includes saturable core 13, winding 14, resistance $R_{L2}$ and signal voltage $E_{S2}$. Current $I_{L1}$ flows in the input stage and current $I_{L2}$ flows in the output stage. Rectifiers 15, 17, 18, 19 and 20 control the direction of current flow. Resistors $R_{S1}$ and $R_{S2}$ provide a path for presenting magnetizing currents flowing against the signal voltages. The black dots and rectifiers indicate the polarity and current flow direction respectively during the first half cycle of the supply voltage $E_p$, and the white dots and rectifiers indicate the polarity and current flow direction respectively during the second half cycle of the supply voltage $E_p$. For the operation of the circuit of FIG. 1, the following equation holds:

$$E_L=I_{L2}R_{L2}=\text{constant}\times\frac{E_{S1}E_{S2}}{E_{p1}}$$

where $E_{S1}$ and $E_{S2}$ are average values of the two signal voltages and $E_{p1}$ is the R.M.S. value of the supply voltage $E_{p1}$. With $E_{p1}$=constant the relationship is simplified to:

$$E_L=\text{constant}\times E_{S1}E_{S2}$$

The circuit therefore performs a multiplication of signal valtages $E_{S1}$ and $E_{S2}$. The above described circuit however is basically limited in performing multiplication due to the circuit structure. Each of the two D.C. signal voltages $E_{S1}$ and $E_{S2}$ has a certain polarity with respect to the rectifiers which must remain unchanged or the circuit becomes inoperative. Four quadrant multiplication cannot be performed with this device.

Figure 2:
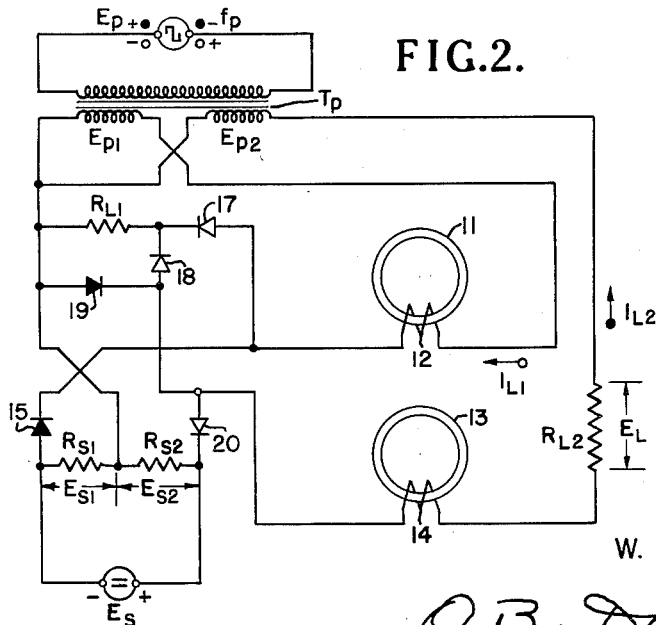
FIG. 2 illustrates the magnetic amplifier square law circuit of this invention.

Referring now to FIG. 2 of the drawings, the multiplier circuit has been modified. The modification consists in rearranging the signal input portion of the circuit. The rest of the circuit remains the same as FIG. 1 and like nomenclature is used for identifying like parts. In this new arrangement, the signals $E_{S1}$ and $E_{S2}$ are provided by the parts $R_{S1}$ and $R_{S2}$ of a center-tapped resistor connected across a direct current signal $E_S$. Signals $E_{S1}$ and $E_{S2}$ are in this rearrangement, each equal to $0.5E_S$. The multiplication of signals $E_{S1}$ and $E_{S2}$ is equivalent to $0.5E_S\times 0.5E_S$ or $0.25E_S^2$. The circuit as modified thus performs a square law function. This square law function circuit may be adapted to form part of a larger circuit as hereinafter described in which four quadrant multiplication is now made possible. A description of the squaring circuits of FIGS. 1 and 2 may be found in the American Institute of Electrical Engineers Transactions, Part I, Communications and Electronics, vol. 77, pages 457–470, September 1958, entitled "Magnetic-Amplifier Operated Ink Recorders," by W. A. Geyger.

Figure 3:
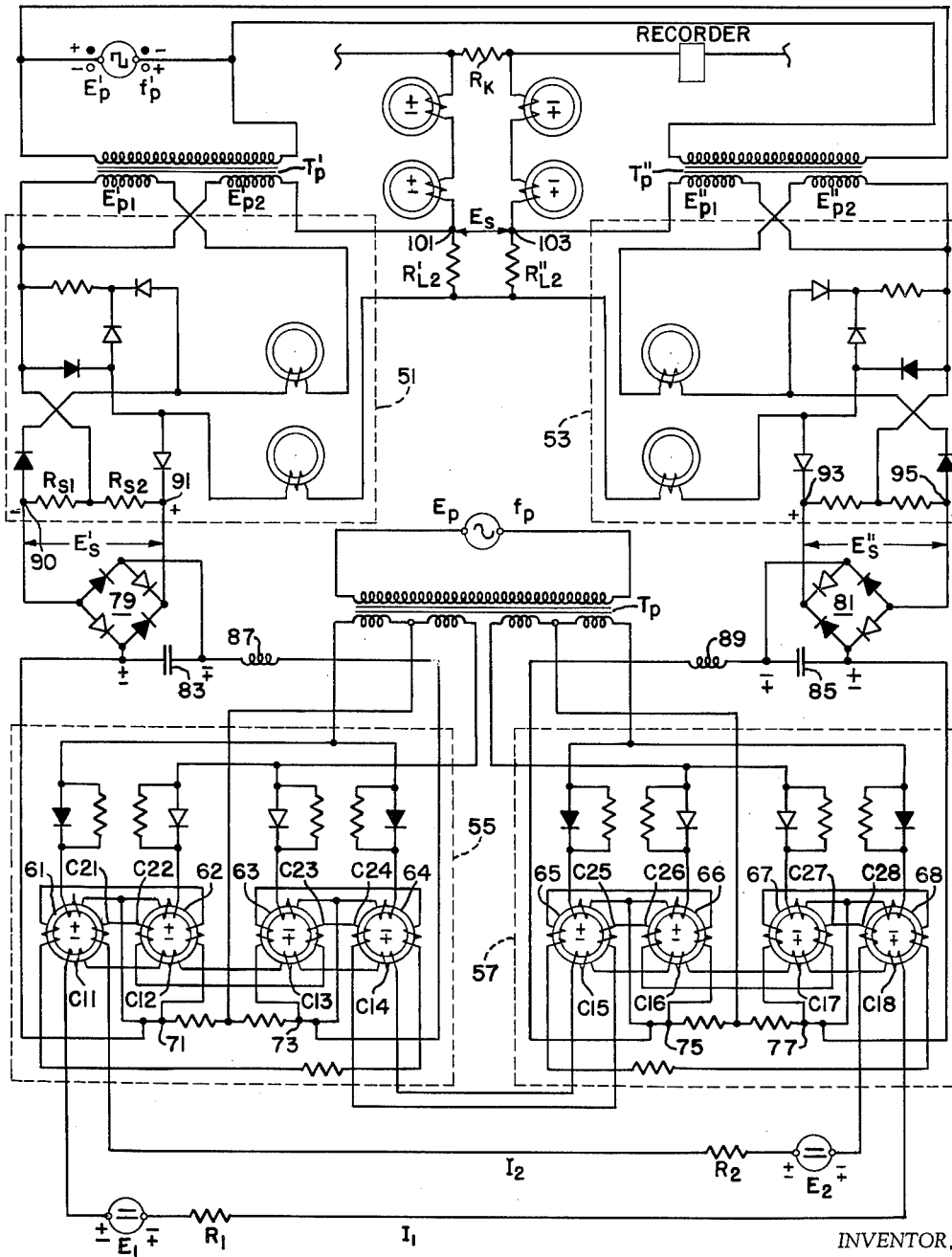
FIG. 3 illustrates the combination of magnetic amplifier square law circuits with magnetic amplifier circuits for the four-quadrant multiplication of direct currents or voltages.

Referring now to FIG. 3 of the drawings, a complete arrangement for four quadrant multiplication is shown in which two magnetic-amplifier square law circuits of FIG. 2 are utilized in combination with two magnetic amplifier push-pull circuits. A square-wave voltage source having a voltage $E_p'$ and a frequency $f_p'$ feeds the primary windings of transformers $T_p'$ and $T_p''$. The transformer $T_p'$ has two secondary windings which supply alternating square wave voltages $E_{p1}'$ and $E_{p2}'$ to the magnetic amplifier square law circuit 51 and in like manner transformer $T_p''$ has two windings which supply alternating square law voltages $E_{p1}''$ and $E_{p2}''$ to the magnetic amplifier square law circuit 53. Signal voltages $E_S'$ and $E_S''$ are supplied to square-law circuits 51 and 53 respectively by push-pull magnetic amplifiers 55 and 57. Magnetic-amplifiers 55 and 57 are conventional self-saturating-type push-pull amplifiers with negative feedback each having a plus-minus ($\pm$) system and a minus-plus ($\mp$) saturable-reactor system. The modification of the magnetic amplifiers 55 and 57 includes the provision of two control windings on each of the cores. Magnetic amplifier 55 is provided with cores 61, 62, 63 and 64 which have control winding windings C11, C12, C13 and C14 respectively and also control windings C21, C22, C23 and C24 respectively. Magnetic amplifier 57 is provided with cores 65, 66, 67 and 68 which have control windings C15, C16, C17 and C18 respectively and also control windings C25, C26, C27 and C28 respectively. Control windings C11 through C18 are serially interconnected to signal source $E_1$ and resistor $R_1$. Control windings C21 through C28 are serially interconnected to signal source $E_2$ and resistor $R_2$. The control windings on the cores of magnetic amplifier 55 are wound in the same sense and the control windings on the cores of 57 are wound in opposite sense. Control windings C21 through C24 are wound in the same sense as control windings C11 through C14 whereas control windings C25 through C28 are wound in opposite sense to control windings C15 through C18.

With this arrangement, when $E_1$ and $E_2$ are of the same polarity, the effect of currents $I_1$ and $I_2$ will be additive in the cores of magnetic amplifier 55 and subtractive or differential in the cores of magnetic amplifier 57. In like manner, when $E_1$ and $E_2$ are opposite in polarity, the effect of currents $I_1$ and $I_2$ will be additive in the cores of magnetic amplifier 57 and subtractive or differential in the cores of magnetic amplifier 55. In other words, when the signal voltages $E_1$ and $E_2$ have the same polarity, the effective control current applied to the cores of magnetic amplifier 55 will be $(I_1+I_2)$ and the effective control current applied to the cores of magnetic amplifier 57 will be $(I_1-I_2)$. When signal voltages $E_1$ and $E_2$ are opposite in polarity, the effective control current applied to the cores of magnetic amplifier 55 will be $(I_1-I_2)$ and the effective control current applied to the cores of magnetic amplifier 57 will be $(I_1+I_2)$. It is a characteristic property of the push-pull type magnetic amplifier with negative feedback that the output voltage $E_1$ is linearly proportional to the control input current. In magnetic amplifiers 55 and 57 the output voltage will be proportional to $(I_1+I_2)$ or $(I_1-I_2)$ depending on the polarity relationship of $E_1$ and $E_2$ as explained above. With $R_1=R_2$, the output voltage from the magnetic-amplifiers 55 and 57 will also be linearly proportional to $(E_1+E_2)$ or $(E_1-E_2)$ depending upon the polarity relationship of $E_1$ and $E_2$.

Let it be assumed, for example, that $E_1$ and $E_2$ have the same polarity. Then the voltage at the output terminals 71 and 73 of magnetic amplifier 55 will be linearly proportional to $(E_1+E_2)$ and the voltage at the output terminals 75 and 77 will be linearly proportional to $(E_1-E_2)$. The outputs from magnetic amplifiers 55 and 57 are connected to the signal input circuits of square law magnetic amplifiers 51 and 53 respectively through rectifier bridges 79 and 81 respectively. Capacitors 83 and 85 and inductors 87 and 89 filter the pulsating D.C. output of the magnetic amplifiers and provide a pure D.C. voltage for the square law circuits 51 and 53. An output signal proportional to $(E_1+E_2)$ will appear across terminals 90 and 91 polarized by the rectifier bridge 79 such that terminal 90 will be negative and terminal 91 will be positive. An output signal proportoinal to $(E_1-E_2)$ will appear across terminals 93 and 95 polarized by rectifier bridge 81 such that terminal 93 will be positive and terminal 95 will be negative. Voltage $$E_S' = \text{constant} \times (E_1+E_2)$$

is divided into two equal voltages by resistors $R_{S1}'$ and $R_{S2}'$ with a D.-C. voltage equal to $$\text{Constant} \times \left(\frac{E_1+E_2}{2}\right)$$

appearing across each resistor. Each of these equal voltages will be multiplied by the square law magnetic amplifier multiplier 51 and the product equal to a $$\text{Constant} \times \left(\frac{E_1+E_2}{2}\right)^2$$

will appear across resistor $R_{L2}'$. Similarly, $$E_S'' = \text{constant} \times (E_1-E_2)$$

and a D.C. voltage equal to a $$\text{Constant} \times \left(\frac{E_1-E_2}{2}\right)^2$$

will appear across $R_{L2}''$. The voltage $E_S$ appearing across the terminals 101 and 103 will be equal to the difference of the voltages across $R_{L2}'$ and $R_{L2}''$ and the polarity of $E_S$ will depend upon which of these voltages is larger. The difference of the voltages across $R_{L2}'$ and $R_{L2}''$ will be D.-C. voltage equal to a $$\text{Constant} \times \left[\left(\frac{E_1+E_2}{2}\right)^2 - \left(\frac{E_1-E_2}{2}\right)^2\right]$$

which is equal to a constant$\times E_1 E_2$. In this manner, the four quadrant multiplication of signals $E_1$ and $E_2$ is achieved.

In the example given signals $E_1$ and $E_2$ were of the same polarity however the circuit of FIG. 3 will perform multiplication of the signals if the polarities are the same or are opposite. Four quadrant multiplication may thus be achieved by the circuit of FIG. 3 as either signal may have either polarity.

An alternating voltage $E_p$ with a frequency $f_p$ supplies the magnetic amplifier circuits 55 and 57 through transformer $T_p$.

In the exemplary embodiment of the multiplier circuit as illustrated in FIG. 3, a magnetic amplifier operated ink recorder is shown connected to the output of the multiplier. In this arrangement the output voltage $E_S$ is applied through a self-balancing magnetic amplifier to resistor $R_k$ of the ink recorder circuit. Any suitable indicating means such as a meter connected thereto may be used for indicating the output of the multiplying circuit.

In the exemplary embodiment Supermalloy 2 mil tape cores, silicon rectifiers and ferroresonant constant voltage transformers were used. The unit was operated at 400 cycles although frequencies in the order of 60 cycles or high power-supply frequencies may be used. The circuit will multiply current values of $I_1=0$ to $\pm 50$ microamperes and $I_2=0$ to $\pm 50$ microamperes. The speed of response of the circuit arrangement of FIG. 3 is of the order of 3 to 4 milliseconds, when using a 400 cycle power supply voltage.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. A magnetic square law circuit for producing an output voltage proportional to the square of a D.-C. input signal comprising a first square wave voltage source, a second square wave voltage source, a converter stage having a first saturable core with a winding thereon, a first resistor and a first unilateral impedance means, means serially interconnecting the winding of said first saturable core, said first resistor and said first unilateral impedance means to said first square wave voltage source, a multiplier stage having a second saturable core with a winding thereon, a second resistor and a second unilateral impedance means, means serially interconnecting the winding of said second saturable core, said second resistor and said second unilateral impedance means to said second square wave voltage source, a third resistor and a fourth resistor, said third and fourth resistors having equal resistance values and being serially connected with a center tap therebetween, means connecting said third resistor to said converter stage, means connecting said fourth resistor to said multiplier stage, means applying a D.-C. input signal across said serially connected third and fourth resistors whereby one-half of the D.-C. signal is applied to said converter stage and the other half of the D.-C. signal is applied to said multiplier stage thereby to produce at the output of the multiplier stage a voltage proportional to the square of the D.-C. signal.

2. In a magnetic multiplier circuit having a converter stage and a multiplier stage with an output circuit in said multiplier stage, a source of first square wave voltage adapted to be applied to said converter stage, a source of second square wave voltage adapted to be applied to said multiplier stage, an input resistor divided by a center tap into a first portion and a second portion, means connecting said first portion of said input resistor to said converter stage, means connecting said second portion of said input resistor to said multiplier stage, a source of D.-C. signal adapted to be applied across said input resistor whereby one-half of the signal is applied to said multiplier stage and the other half of the signal is applied to said converter stage, each half of the signal being nullified together to provide an output voltage across said output circuit that is proportional to the square of the D.-C. signal.

References Cited in the file of this patent

UNITED STATES PATENTS

| | | |
|---|---|---|
| 2,900,137 | Giser | Aug. 18, 1959 |
| 2,906,459 | Lovell | Sept. 29, 1959 |

FOREIGN PATENTS

| | | |
|---|---|---|
| 553,594 | Italy | Dec. 28, 1956 |

OTHER REFERENCES

Finzi et al.: An Application of Magnetic Circuits to Perform Multiplications and Other Analytical Operations, Department of Electrical Engineering, Carnegie Institute of Technology, Pittsburgh 13, Pa., January 1953, Technical Report No. 12, Magnetic Amplifiers N7 ONR 30308.